(12) United States Patent
Estrada (10) Patent No.: US 6,646,763 B1
(45) Date of Patent: Nov. 11, 2003

(54) SPECTRAL COLOR MATCHING TO A DEVICE-INDEPENDENT COLOR VALUE

(75) Inventor: James J. Estrada, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/439,643

(22) Filed: Nov. 12, 1999

(51) Int. Cl.⁷ .............................................. G06K 15/00
(52) U.S. Cl. ........................................ 358/1.9; 358/1.6
(58) Field of Search .......................... 358/1.1, 1.6, 1.9, 358/1.13, 3.21, 3.23, 3.24, 518, 523, 522, 524, 525; 399/1; 345/589, 591, 602, 601, 600, 603, 604

(56) References Cited

U.S. PATENT DOCUMENTS 4,926,251 A * 5/1990 Sekizawa et al. ............ 358/535
5,878,195 A * 3/1999 Mahy .......................... 358/1.9

OTHER PUBLICATIONS

Haase et al., "Modeling Pigmented Materials for Realistic Image Synthesis", ACM Transactions on Graphics, vol. 11, No. 4, Oct. 1992, pp. 305–335.
McGinnis, Jr., "Spectrophotometric Color Matching With the Least Square Technique", Color Engineering, vol. 5, No. 6, Nov.–Dec. 1967, pp. 22–27.
Allen, "Basic equations used in computer color matching, II. Tristimulus match, two–constant theroy", J. of the Optical Society of America, vol. 64, No. 7, Jul. 1974, pp. 991–993.
Allen, "Basic Equations Used in Computer Color Matching", J. of the Optical Society of America, vol. 56, No. 9, Sep. 1996, pp. 1256–1259.
Kuehai, "The Mathematics of Computer Colorant Formulation", Lexington Books, D.C. Health and Co. chapter 4, 1975, pp. 41–67.

* cited by examiner

Primary Examiner—Arthur G. Evans
(74) Attorney, Agent, or Firm—Fish & Richardson P.C.

(57) ABSTRACT

Methods, systems, and apparatus for mapping a nonspectral representation of a target color, such as an input color tuple, to a set of concentration values for a set of device-specific colorants. The invention includes using the input color tuple to derive a first set of colorant concentration values from a color lookup table; and refining the first set of colorant concentration values by an iterative non-linear process to generate a final set of colorant concentration values. The first set of colorant concentration values can derived by using an input color tuple as an index to obtain grid-point concentration values at two grid points of the color lookup table and calculating the first set of colorant concentration values as a linear interpolation of the grid-point concentration values. In an implementation that provides a color function table of color-additive function values, the iterative non-linear process can include iteratively (a) calculating an interim color tuple from an interim set of colorant concentration values and the color function table, the initial interim set of colorant concentration values being the first set of colorant concentration values, and (b) deriving an interim set of colorant concentration values from a difference between the input color tuple and the interim color tuple. The calculations can include calculating a partial derivative of an error function from the difference between the input color tuple and the interim color tuple; and using the partial derivative to derive a successor interim set of colorant concentration values from a current interim set of colorant concentration values.

31 Claims, 3 Drawing Sheets

SPECTRAL COLOR MATCHING TO A DEVICE-INDEPENDENT COLOR VALUE

BACKGROUND OF THE INVENTION

The present invention relates to the fields of color matching and color management systems.

For the rendering of color images from a source in which the color information is in a device-independent format, yet to be rendered in a device-specific manner, conventional device-independent color management uses calorimetric information only. Device-independent triples, such as XYZ, are converted to colorant concentrations for printing on a particular device using a lookup table indexed by a device-independent triple whose lattice points contain colorant concentrations. Because lookup tables used for this purpose must necessarily be of a practical size, image pixel values generally miss the lattice points. To compensate for this, a linear interpolation is conventionally carried out to approximate the intermediate colorant values. The lookup table lattice points must have very accurate values for both the primary colorants and their corresponding overprints. Table sizes in the ranges 10×10×10 to 33×33×33 are in common use. In order to populate such tables, thousands of accurate colorimetric measurements must be taken.

A number of difficulties are in the use of conventional color management techniques. It is difficult to calculate colorant concentrations that closely and perceptually match a requested device-independent value. Because assumptions about the linearity of the given color space are usually incorrect, it is difficult to obtain accurate interpolation. Extensive measurements must be taken to fill a lookup table. It is difficult to produce invariant matches, that is, colors that will match under all lighting conditions. It may be necessary to limit color management to CMYK device spaces and to require that many overprints be measured to populate the lookup tables.

SUMMARY OF THE INVENTION

In general, in one aspect, the invention provides methods, systems, and apparatus, including computer program apparatus, for mapping a nonspectral representation of an input color to a set of concentration values for a set of device-specific colorants, where the representation is an input color tuple. A tuple is a representation of two or more components, such as XYZ color components. The invention includes using the input color tuple to derive a first set of colorant concentration values from a color lookup table; and refining the first set of colorant concentration values by an iterative non-linear process to generate a final set of colorant concentration values.

Advantageous implementations of the invention include one or more of the following features. The first set of colorant concentration values is derived by using an input color tuple as an index to obtain grid-point concentration values at two grid points of the color lookup table and calculating the first set of colorant concentration values as a linear interpolation of the grid-point concentration values. In an implementation that provides a color function table of color-additive function values, the iterative non-linear process includes iteratively (a) calculating an interim color tuple from an interim set of colorant concentration values and the color function table, the initial interim set of colorant concentration values being the first set of colorant concentration values, and (b) deriving an interim set of colorant concentration values from a difference between the input color tuple and the interim color tuple. The calculations includes calculating a partial derivative of an error function from the difference between the input color tuple and the interim color tuple; and using the partial derivative to derive a successor interim set of colorant concentration values from a current interim set of colorant concentration values.

In general, in another aspect, the invention provides methods, systems, and apparatus, including computer program apparatus, for color matching. The invention includes apparatus or steps that receive a target color value, the target color value being a nonspectral representation of a target color; receive a spectral definition of each colorant in a set of colorants; obtain an initial set of colorant concentrations for the set of colorants, each concentration corresponding to a respective colorant in a set of colorants; and generate iteratively a final set of colorant concentrations by calculating a rendered color value, the rendered color value being a nonspectral representation of a rendered color produced by a mixture of colorants defined by the set of colorant concentrations, calculating a difference between the rendered color and the target color, and modifying the set of colorant concentrations according to the calculated difference.

Advantageous implementations of the invention can include one or more of the following features. A threshold is received, and the iteration terminates when a calculated difference between the rendered color and the target color is less than the threshold or an iteration limit is reached. Obtaining an initial set of colorant concentrations includes using the target color value to select an index into a colorant concentration lookup table; and obtaining the initial set of colorant concentrations from the indexed contents of the lookup table. Calculating a rendered color corresponding to the set of colorant concentrations includes calculating a rendered color reflectivity function from the set of colorant concentrations and a set of colorant reflectivity functions, each colorant reflectivity function corresponding to a respective one of the colorants; and calculating a rendered color value from the rendered color reflectivity function. The rendered color value is calculated using an illuminant selected in response to a user input identifying desired viewing conditions. Modifying the set of colorant concentration values includes calculating a set of colorant concentration corrections from the difference between the rendered color value and the target color value. The target color value is a triple defining a location in a color space. The target color value defines a device-independent color. The difference between the rendered color and the target color is calculated in a perceptually linear color space. The perceptually linear color space is CIELAB or CIELUV. The set of colorants is an arbitrary set of two or more colorants. The spectral representation of each colorant derives from reflectivity measurements of the colorant taken at intervals over the visible spectrum without overprinting. Modifying the set of colorant concentration values includes modeling the difference between the target color and the rendered color as a scalar field over the set of colorants; and calculating a partial derivative of the surface with respect to each colorant to calculate a correction for each colorant.

Advantages that can be seen in implementations of the invention include one or more of the following. In many instances, use of the invention achieves an invariant, that is, a spectral, match to target color. Successful operation of the invention to converge to a matching color does not depend on interpolation or colorimetry. If a color lookup table is used to accelerate convergence to a color match, it may be sparse and approximate. The invention can produce colorant concentrations that closely and perceptually match a requested device-independent value. The invention works with any transparent colorants and any number of them. The invention does not require a spectrum for the target color—it only requires calorimetric data for the match—and nevertheless it can generate a spectrum for the target color. The invention relates color management and color matching to each other in a new way.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
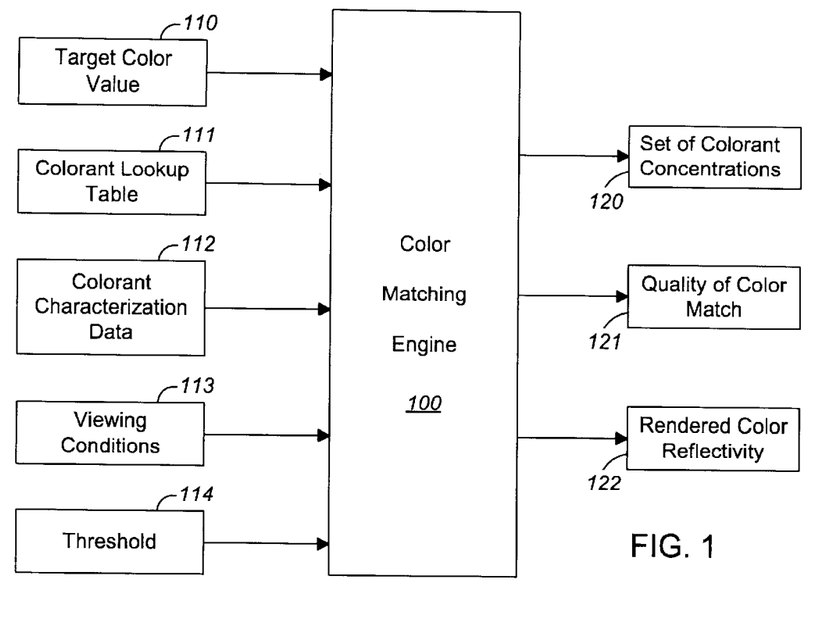
FIG. 1 is a block diagram of a system for obtaining a spectral color match for a target color using any number of colorants.

FIG. 1 is a block diagram depicting an implementation of a system for obtaining a spectral color match for a target color using a set of any number of transparent colorants. For example, the set of colorants can be a set of CMYK inks or a set of Pantone® Hexachrome® inks. (Hexachrome is a six-color printing process developed by Pantone, Inc. of Carlstadt, N.J.) Other colorants can also be used; and the method for matching the target color by a mixture of colorants is not limited by, nor dependent upon, the number of colorants or the colors of the colorants used.

As shown in FIG. 1, the system has a color matching engine 100 receiving as input a target color value 110, an optional colorant lookup table 111, colorant characterization data 112, an optional viewing conditions 113, and a threshold (or target error value) 114. The color matching engine 100 first calculates and then outputs a set of colorant concentrations 120 that defines a mixture of colorants that produces a color that matches the target color specified by target color value 110 under viewing conditions 113. Optionally, the color matching engine 100 also outputs a quality of color match 121, which is a measure of the degree to which the rendered color matches the target color. Here, and throughout this specification, the term rendered color is used to refer to the color produced by a mixture of colorants mixed according to a set of colorant concentrations. Optionally, the color matching engine 100 also outputs color reflectivity data 122 for the rendered color.

Target color value 110 is a nonspectral representation of the target color to be produced by the color matching engine 100. A nonspectral representation is one that does not include spectral data such as reflectivity data. For example, an representation of a color as tri-stimulus values is a nonspectral representation. In the.implementation that will be described in detail below, target color value 110 is represented in as values (X, Y, Z) of the 1931 CIE (Commission Internationale de l'Éclairage) XYZ color space. In alternative implementations, target color value 110 is represented in LAB or any of the other device-independent color spaces derived from the XYZ color space, or the color value 110 is represented in an form that can be mapped to Lab or XYZ color space.

Colorant lookup table 111 can be implemented as an indexed list of sets of colorant concentrations. Each element of the list contains a set of colorant concentrations that specifies a mixture with a color matching the index color. In one implementation, the colorant lookup table 111 is indexed by coordinates in the color space in which the target color value 110 is represented. In an alternative implementation, the table is always indexed by L*a*b* coordinates. The colorant lookup table 111 returns a set of colorant concentrations.

Colorant characterization data 112 embodies a set of measurements of reflectance of visible light off of each of the colorants in a colorant set. The colorant characterization data 112 defines the colorant set to the color matching engine 100. The colorant set can be any arbitrary set of two or more colorants. It is advantageous to provide the colorant characterization data 112 in the form of a color-additive function, which will be described below, for each colorant in the colorant set.

In one implementation, reflectances are measured in 10 nm increments ranging from 400 nm to 700 nm wavelength and at 25%, 50%, 75% and 100% of colorant down. In other implementations, reflectances are measured over a different range of wavelengths, or using a different wavelength increment, or with a nonuniform wavelength interval. Colorant reflectivity data can also be measured for different percentages of colorant down, ranging from just above 0% colorant down to 100% colorant down. The increment can be differ from 25% intervals, and need not be uniform.

Viewing conditions 113 specifies the illumination under which the rendered color is to be viewed. The viewing conditions 113 can be default viewing conditions or can be specified by user input. The viewing conditions can designate one of the CIE-defined illumination functions, such as D65. In the present implementation, the viewing conditions include as observer the 2-degree standard observer. Other viewing conditions can also be selected.

The threshold 114 specifies a maximum acceptable ΔE, that is, a maximum acceptable difference between the target color value 110 and the rendered color produced by a mixture of colorants mixed according to the calculated set of colorant concentrations. The threshold 114 can be a default threshold value or it can be specified by user input.

The set of colorant concentrations 120 is generated by the color matching engine 100 to specify the composition of a mixture of colorants with a color that matches the target color represented by the target color value 110.

The quality of color match 121 is generated by the color matching engine 100 to indicate the closeness of the match between the rendered color and the target color represented by the target color value 110.

The rendered color reflectivity 122 is a calculated set of reflectances of visible light off of the rendered color in 10 nm increments ranging from 400 nm to 700 nm wavelengths. In other implementations, different wavelength ranges as well as different wavelength increments can be returned, and the wavelength interval between reflectances can be nonuniform. To avoid having to interpolate, measurement should be taken at the wavelengths for which the viewing conditions power spectrum $P_\lambda$ vector has values.

Figure 2:
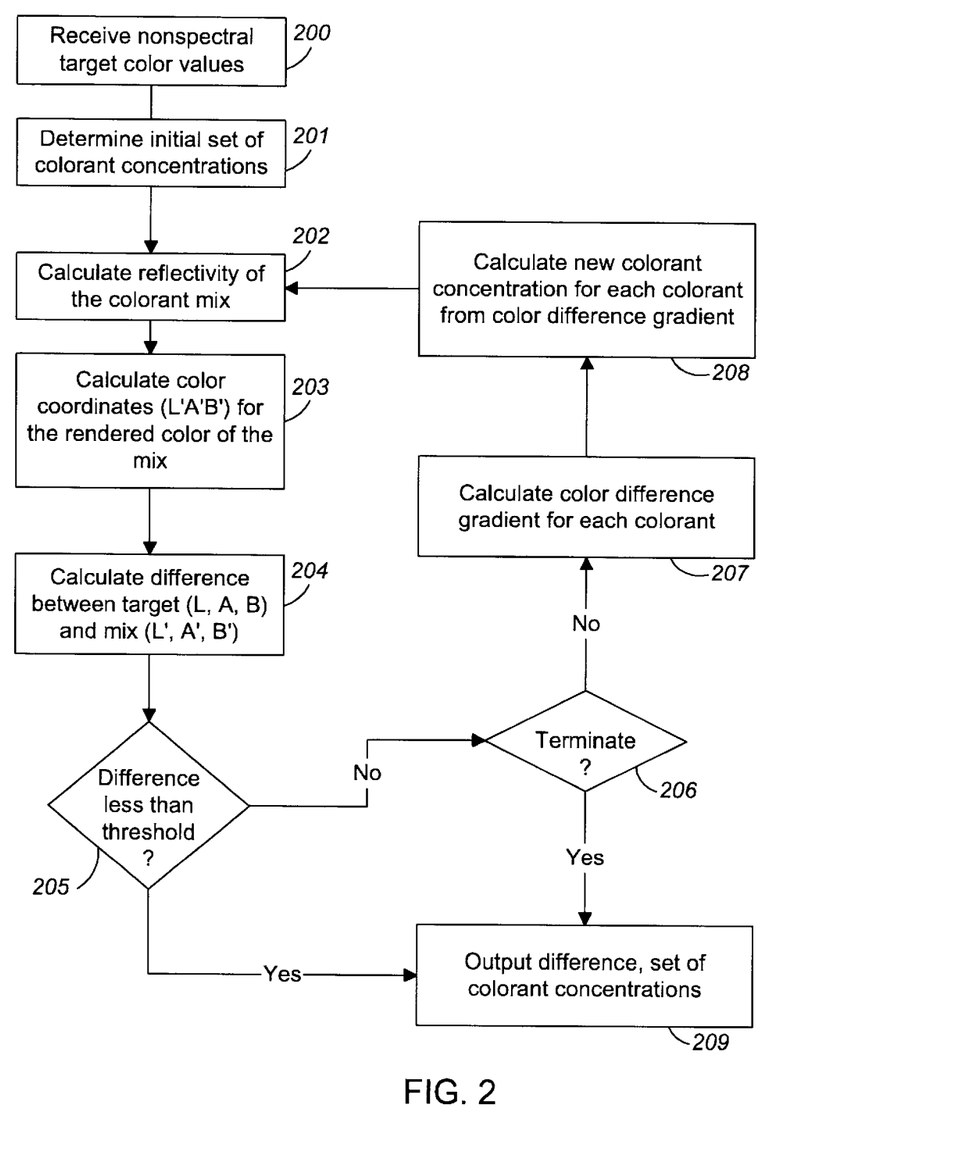
FIG. 2 is a flowchart of a method to obtain a spectral color match for a target color using any number of colorants.

As shown in FIG. 2, the color matching engine implements an iterative process to generate a set of colorant concentrations for a mixture of colorants to match target color value. The color matching engine receives as input a target color value (step 200). The color matching engine determines an initial set of colorant concentrations (step 201). The initial set of colorant concentrations can be determined as the indexed contents of a colorant lookup table, where the index is selected based on the target color value. The initial set of colorant concentrations can be determined in other ways as well, such as by solving the matrix equation (3), discussed below, in a least squares sense.

The core of the color matching process is the iteration beginning at step 202 and ending at step 208. For step 202, the color matching engine 100 requires as input a set of colorant concentrations. Initially, the set of colorant concentrations is determined at step 201; in subsequent iterations, the set of colorant concentrations is determined at step .208. The color matching engine calculates reflectivity data for a mixture of colorants mixed according to the concentrations specified by the given set of colorant concentrations (step 202). The method by which reflectively data is calculated is described more fully below, in reference to FIG. 3.

The color matching engine then calculates a rendered color value representing the color rendered by a mixture of colorants mixed according to a set of colorant concentrations (step 203). The rendered color value colorant vector is calculated in L*a*b* color space (CIELAB) and is represented by coordinates (L', A', B') in that space. The color matching engine then calculates the difference between the vector (L, A, B) representing target color value in L*a*b* color space and the vector (L', A ', B') representing the rendered color produced by the mixture of colorants (step 204). The color difference is generally calculated as:

$$\Delta E = \sqrt{(L-L')^2 + (A-A')^2 + (B-B')^2} \quad (1)$$

As will be seen, it is advantageous to work with the square of the color difference, calculated as:

$$\Delta E = (L-L')^2 + (A-A')^2 + (B-B')^2 \quad (2)$$

Other measures or color spaces, such as CIELUV, can be used. It is advantageous that the color space and color distance metric be perceptually uniform, at least in the range of applications in which the color matching engine will be used.

The color matching engine then determines whether the calculated difference is less than the threshold (step 205). If the calculated difference is not less than the threshold, the color matching engine checks whether the calculation should be terminated (step 206). The calculation can be terminated, for example, if the error $\Delta E$ does not improve after 3 iterations, or after some maximum number of iterations has been completed.

If the calculation is not terminated ("no" branch of decision step 206), the color matching engine calculates for each of the colorants the gradient of the color difference with respect to each colorant concentration (step 207). The color difference gradient is then used to calculate a new colorant concentration for each colorant in the set of colorants (step 208) and the calculation continues at step 202. The gradient and colorant concentration calculations (steps 207 and 208) will be described in detail later.

The iteration ends when the color difference is less than the threshold ("yes" branch of decision step 205) or the calculation is terminated for some other reason, such as a failure to converge ("yes" branch of decision step 206). When the process ends ("yes" branches of decision steps 205 and 206), the color matching engine outputs the generated set of colorant concentrations and, optionally, the quality of color match and the rendered color reflectivity (step 209). The quality of color match is represented by the difference calculated at step 204. The rendered color reflectivity 122 is the reflectivity of the colorant mixture calculated at step 202 for a mixture of colorants mixed according to the generated colorant concentrations.

Figure 3:
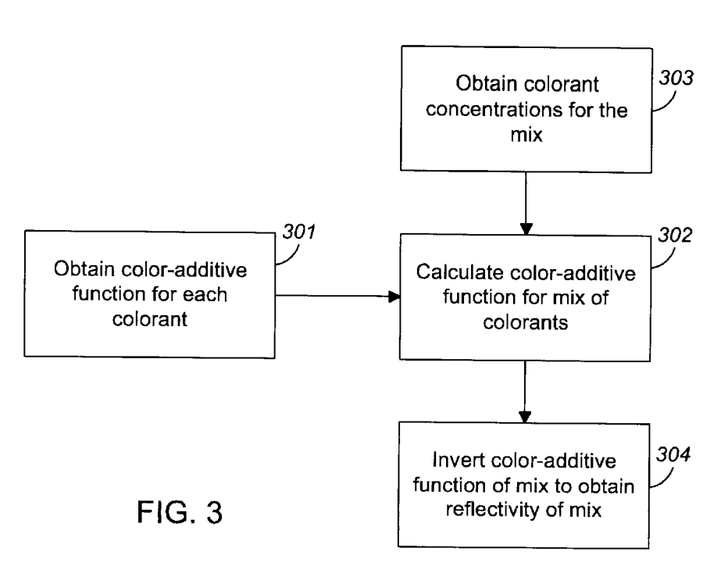
FIG. 3 is a flowchart of a method to obtain the reflectivity for a mixture of colorants, given the reflectivity of each of the colorants.

FIG. 3 illustrates a process for calculating the reflectivity of a colorant mixture to implement step 202 (FIG. 2). Step 202 requires as input colorant characterization data and a set of colorant concentrations. At step 301, the color matching engine obtains colorant characterization data for each of the colorants in the form of a color-additive function for each of the colorants.

Color-additive functions are derived from colorant reflectivity data according to the single-constant Kubelka-Munk ink model. The color-additive functions $\theta_\lambda^i$ (which are K/S in Kubelka-Munk theory) are calculated from the colorant reflectivity data (a set of spectral measurements of the colorants) according to the following Kubelka-Munk ink equation:

$$\theta_\lambda^i = \frac{(1-R_\lambda^i)^2}{2R_\lambda^i}$$

where denotes the i-th colorant (note that the superscript does not denote an exponent), $\lambda$ denotes a wavelength, and $R_\lambda^i$ denotes the reflectivity of the i-th colorant at wavelength $\lambda$.

There is an implicit parameter in $\theta_\lambda^i$, namely the percent color down at which the corresponding $R_\lambda^i$ were measured. In other words, there is one vector of theta values for each colorant down percentage; in the implementation being described, these are 25%, 50%, 75%, and 100%.

An interesting property of these functions $\theta_\lambda^i$ is that they are color-additive and thus the result of adding given concentrations of the colorant functions yields a colorant function for the resultant color. For example, the functions for cyan and yellow may be calculated and added to yield the function for the resultant hue of green. In the present notation, this my be written as follows.

$$\theta_\lambda^G = \sum_{i \in \{C,Y\}} c_i \theta_\lambda^i$$

where i ranges over the two colorants C (cyan) and $\lambda$ (yellow) and A ranges over the visible spectrum, and where $c_i$ is the concentration of the i-th colorant being used in the mixture, in this case, the concentration of cyan or yellow.

More generally, where there are n colorants in a set of colorants P (a set of primaries) and the colorants are denoted by numbers 1 through n, the color-additive function $\theta_\lambda^m$ of a mixture m is given by the following equation.

$$\theta_\lambda^m = \sum_{i \in P} c_i \theta_\lambda^i$$

In performing this calculation, which vector of theta values $\theta_\lambda^i$ is chosen depends on the value $c_i$. In the present implementation, the vector whose percent colorant down is closest to $c_i$ is chosen. In an alternative implementation, the vector values are calculated by interpolation for each colorant according to $c_i$ the concentration of the colorant. No particular kind of interpolation is required. For example, a linear interpolation or an interpolation along the gamma curve of the colorant in question can be used.

The color matching engine obtains a set of colorant concentrations (a vector of $c_i$) at step 303. Initially, the vector is provided by step 202; in subsequent iterations, the vector is provided by step 208. The color matching engine calculates a color-additive function $\theta_\lambda^m$ for a mixture of the colorants (step 302) by multiplying the vector of $c_i$ by a matrix whose columns consist of the colorant color-additive functions obtained in step 301. Mathematically, the color matching engine calculates a color-additive function for a mixture m of colorants according to the equation $$\begin{bmatrix} \theta_{400}^1 & \theta_{400}^2 & \cdots & \theta_{400}^n \\ \theta_{410}^1 & \theta_{410}^2 & \cdots & \theta_{410}^n \\ \vdots & & & \vdots \\ \theta_{700}^1 & \theta_{700}^2 & \cdots & \theta_{700}^n \end{bmatrix} \begin{bmatrix} c_1 \\ c_2 \\ \vdots \\ c_n \end{bmatrix} = \begin{bmatrix} \theta_{400}^m \\ \theta_{410}^m \\ \vdots \\ \theta_{700}^m \end{bmatrix}, \quad (3)$$

where the columns of the matrix are color-additive functions of the component colors derived from spectral data taken at 10 nm intervals as described above. (Recall that the columns 1 through n for the n colorants will be chosen to correspond in percent colorant down to the $c_i$.) This is generally an overdetermined matrix equation, and it can be solved by known numerical methods, such as the method of normal equations, to achieve a solution in the least squares sense. However, the results achieved by following this approach are not satisfactory, and in the present implementation, the vector of $c_i$ values is calculated by iterative refinement—in particular, by searching for a minimum of the error term $\Delta E^2$, as will be described—rather than by using traditional numerical methods.

The color matching engine then inverts the color-additive function of the mixture to obtain reflectivity data for the color rendered by the mixture (step 304). This is done by solving the Kubelka-Munk color-additive function for the reflectivity, and is expressed as:

$$R_\lambda^m = 1 + S - \sqrt{S^2 + 2S}$$

where $$S = \sum_i c_i \theta_\lambda^i.$$

A process will now be described that can be performed at step 203 (FIG. 2) to calculate the coordinates (L, A, B) of a color rendered by a mixture of colorants mixed according to a set of colorant concentrations. Step 203 requires as input a colorant mixture's reflectivity data ($R_\lambda^m$), the CIE perceptual color-matching functions ($\bar{x}_\lambda, \bar{y}_\lambda, \bar{z}_\lambda$), and an illuminant $P_\lambda$ (the power distribution of the viewing conditions white point).

The color matching engine calculates the mixture's coordinates in XYZ space using discrete analogs of the well-known CIE integrals, namely:

$$X = k \sum_\lambda P_\lambda \bar{x}_\lambda R_\lambda^m$$

$$Y = k \sum_\lambda P_\lambda \bar{y}_\lambda R_\lambda^m$$

$$Z = k \sum_\lambda P_\lambda \bar{z}_\lambda R_\lambda^m$$

where k is a constant calculated so that bright white has a Y value of 100.

Finally, the color matching engine calculates the mixture's coordinates (L', A', B') by applying the well-known linear transform to convert form XYZ color space to L*a*b* color space.

Steps 207 and 208 of FIG. 2 will now be described in more detail.

The gradient of the color difference squared, $\Delta E^2$, with respect to the concentration of the i-th colorant is calculated as:

$$\frac{\partial \Delta E^2}{\partial c_i} = k \sum_\lambda P_\lambda \Theta_\lambda^{(i,m)} [\Delta L \bar{y}_\lambda + \Delta A \bar{x}_\lambda - \Delta B \bar{z}_\lambda] \quad (4)$$

where $$\Theta_\lambda^{(i,m)} = \theta_\lambda^i - \frac{\theta_\lambda^i \theta_\lambda^m + \theta_\lambda^i}{\sqrt{(\theta_\lambda^m)^2 + 2\theta_\lambda^m}}$$

$$\Delta A = \frac{1000(A - A')}{3X^{2/3} X_n^{1/3}}$$

$$\Delta B = \frac{400(B - B')}{3Z^{2/3} Z_n^{1/3}}$$

$$\Delta L = \frac{232(L - L') - 1000(A - A') + 400(B - B')}{3Y^{2/3} Y_n^{1/3}}$$

L, A, B are the L*a*b* coordinates of the target color

L', A', B' are the L*a*b* coordinates of the mixture color $X_n$, $Y_n$, $Z_n$ are the XYZ coordinates of the viewing conditions white point and X, Y, Z are the XYZ coordinates of the mixture color.

The color matching engine uses the gradient of the color difference with respect to a colorant concentration to calculate a new colorant concentration for each of the colorants (step 208). More particularly, for each colorant, the value $$\left| \frac{\partial \Delta E^2}{\partial c_i} \right|$$

is scaled if a large mismatch occurs—for example, if a correction to a concentration has a magnitude greater than 1.0 or if the resulting concentration cannot be realized physically. The scaled value is calculated to be no greater than 0.5. The concentration $c_i$ is increased or decreased $$\left( \text{according to the sign of } \frac{\partial \Delta E^2}{\partial c_i} \right)$$

by the original value or, if one has been calculated, by the scaled value. Because use of a lookup table provides good initial colorant concentration estimates, it is sufficient for generating the scaled value simply to divide the magnitude by 10 until it is less than one (if greater than one) and then divide by two until less than or equal to 0.5 (if greater than 0.5), and to treat each of the scaled values as independent of the others.

The expression in equation (4), above, for the partial derivative of $\Delta E^2$ was derived from the following formulas that relate the XYZ to L*a*b coordinates.

$$L=L^*=116(Y/Y_n)^{1/3}-16$$

$$A=a^*=500((X/X_n)^{1/3}-(Y/Y_n)^{1/3})$$

$$B=b^*=200((Y/Y_n)^{1/3}-(Z/Z_n)^{1/3})$$

While satisfactory, use of these formulas may result in less than optimal matches in areas of highlights, or for very light colors generally. To generate optimal matches for such colors, the partial derivative of the error function used for light colors is derived from the following formulas.

$$L=L^*=116(Y/Y_n)^{1/3}-16 \text{ for } Y/Y_n>0.008856$$

$$L=L^*=903.3(Y/Y_n) \text{ otherwise}$$

$$A=a^*=500(f(X/X_n)-f(Y/Y_n))$$

$$B=b^*=200(f(Y/Y_n)-f(Z/Z_n))$$

where $$f(t)=t^{1/3} \text{ for } t>0.008856$$

$$f(t)=7.787t+16/116 \text{ otherwise}$$

The partial derivative for very light color has the same form as shown in Equation (4), above, with the following different values for the following terms.

$$\Delta A = \frac{1000 \cdot l \cdot (A-A^l)}{X_n}$$

$$\Delta B = \frac{400 \cdot l \cdot (B-B^l)}{Z_n}$$

$$\Delta L = \frac{232 \cdot l \cdot (L-L^l) - 1000 \cdot l \cdot (A-A^l) + 400 \cdot l \cdot (B-B^l)}{Y_n}$$

where l=7.787.

As will be described in more detail in reference to FIG. 4, one advantage of the present invention is that it can be implemented to provide a workflow that is backward compatible in operation with the conventional workflows of widely used publishing systems. In a conventional workflow, a device independent triple is converted to the appropriate colorants. In a PostScript® workflow, for example, the triple is taken as an index into the RenderTable in a selected color rendering dictionary (CRD). The RenderTable is a three-channel color lookup table (CLUT). A linear interpolator calculates colorant values as a the result of a linear interpolation between two grid points of the RenderTable. In the case of an ICC (International Color Consortium) workflow, the triple is also used as an index into a CLUT (which is sometimes referred to as a calibration table) in an ICC device profile, and a linear interpolator calculates colorant values as a the result of a linear interpolation between two grid points of the CLUT.

Figure 4:
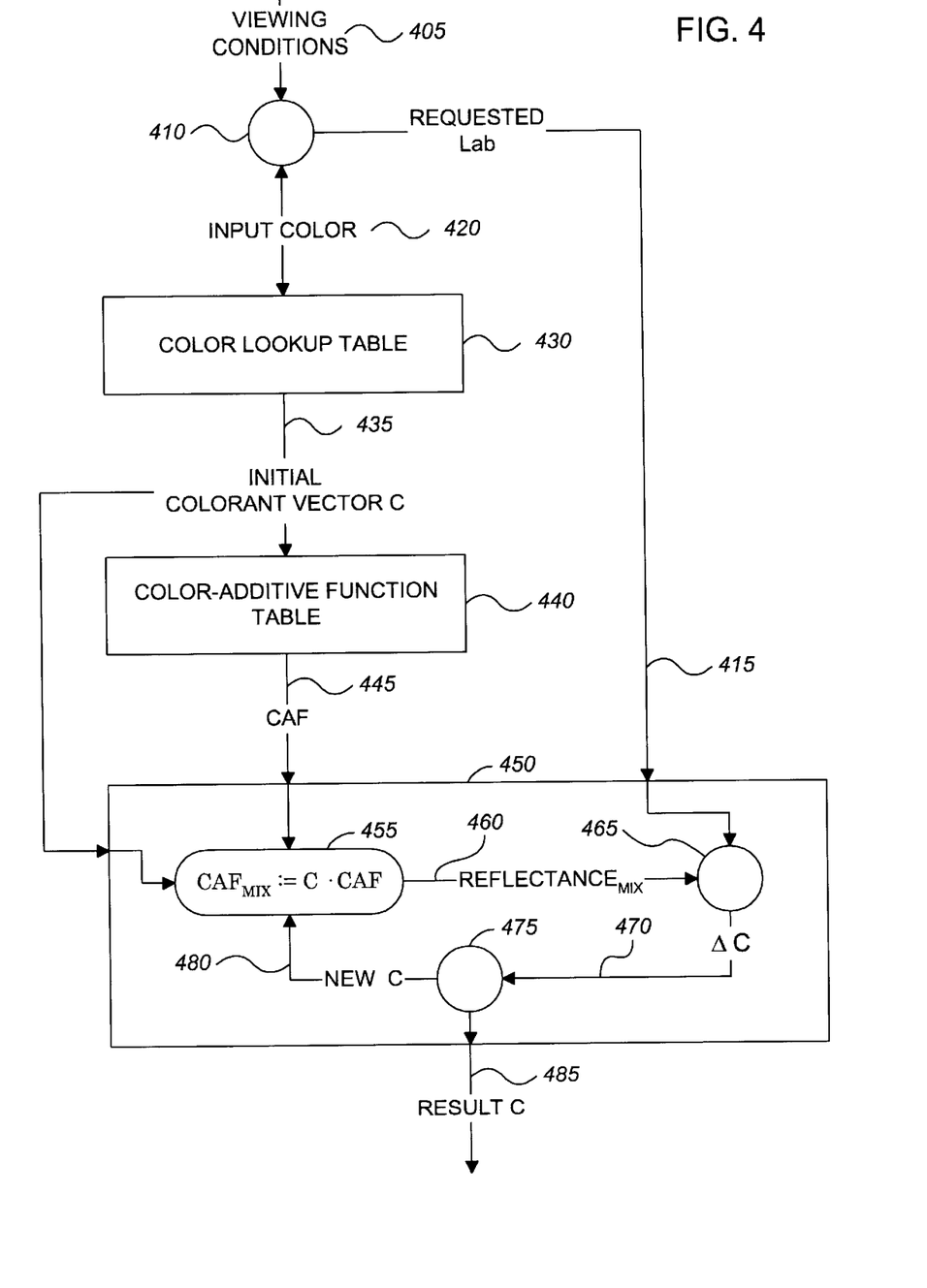
FIG. 4 is a schematic diagram illustrating color management workflow in accordance with the invention.

As illustrated in FIG. 4, in a workflow in accordance with the present invention, a color lookup table 430 is used to produce an initial colorant vector 435 from an initial input color 420. The values at table grid points can be used, as can values linearly interpolated from the grid point values, as are conventionally produced in the first part of a PostScript or ICC publishing workflow. Backward compatibility is provided in that interpolated values can be provided as an output of the process as well as being used as a starting point for the non-linear process of iterative refinement 450 that has been described. This refinement process 450 can be implemented using a second precalculated table 440—the table of color-additive function values—to refine the values produced in the first stage from the color lookup table, as has already been described. Briefly, the input color 420 and viewing conditions 405 are processed (operation 410) to generate an L*a*b* representation of the requested or target color 415. The color-additive function values 445 from the precalculated table 440 and a colorant vector C (either the initial vector 435 or a refined vector 480, which will be described) are processed to compute reflectances 460 of the colorant mix represented by the vector C (operation 455). The color represented by reflectances 460 and the requested color 415 are compared (operation 465) and the difference components 470 are used to calculate a new colorant vector C 480 using the techniques described in reference to Equation 4, above (operation 475). If the vector C is close enough to the requested color 415, it is an output result 485 of the workflow process.

The invention can be implemented or embedded in a variety of systems and devices to replace color interpolation technologies or subsystems. It can be included, for example, in implementation of the PostScript® language, or in a profile tool to populate a color lookup table in an ICC (International Color Consortium) device profile. An ICC profile is a description of the color characteristics for a device, such as a monitor, scanner or printer, and can be used to translate color data created on one device into the native color space of another device. To populate such a color lookup table, one needs color values at the grid points of the table. Generally, when taking measurements from color patches, one finds colors that are not on the grid of Lab colors, and therefore one has had to interpolate. With the present invention, one can calculate the values for a multi-dimensional color lookup table for an ICC profile and achieve the benefits pointed out in this specification.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying, information to the user and a keyboard and a pointing device such as a mouse or a trackball by which the user can provide input to the computer system. The computer system can be programmed to provide a graphical user interface through which computer programs interact with users.

By way of example, a printing device implementing an interpreter for a page description language, such as the PostScript® language, includes a microprocessor for executing program instructions (including font instructions) stored on a printer random access memory (RAM) and a printer read-only memory (ROM) and controlling a printer marking engine. The RAM is optionally supplemented by a mass storage device such as a hard disk. Then essential elements of a computer are a processor for executing instructions and a memory. A computer can generally also receive programs and data from a storage medium such as an internal disk or a removable disk. These elements will also be found in a conventional desktop or workstation computer as well as other computers suitable for executing computer programs implementing the methods described here, which can be used in conjunction with any digital print engine or marking engine, display monitor, or other raster output device capable of producing color or gray scale pixels on paper, film, display screen, or other output medium.

The invention has been described in terms of particular embodiments. Other embodiments are within the scope of the following claims. For example, the steps of the invention can be performed in a different order and still achieve desirable results. Functions other than $\theta_\lambda^i$ that have the property of being color additive can be used. Color-difference formulas calculated in other spaces, such as CIELUV or CIE 94, with their corresponding partial derivatives, can be used. In addition, formulas developed for particular applications, such as the CMC(l:c) (Color Measurement Committee) color difference formulas, with their corresponding partial derivatives, can be used.

Device-independent color spaces other than the ones specifically mentioned can be used, such as calibrated RGB and calibrated CMYK, each of which can be mapped to XYZ triples and so can be accepted as input in place of XYZ triples. Finally, while the invention has been designed for use in systems in which colorants are mixed physically, it can also be applied where colorants are mixed visually, such as by halftoning dots. Although the Kubelka-Munk theory does not hold as well in the latter situation, other ink models can be used for that situation; and in general the invention can be implemented on the basis of other ink models.

In addition, the iterative process for refining a set of colorant vectors can be based on a technique for finding a minimum of an error function other than one described above. For example, a Levenberg-Marquardt (LV) algorithm can be used to solve the non-linear problem $\Delta E^2=0$.

What is claimed is:

1. A method for color matching, comprising:
   receiving a target color value, the target color value being a nonspectral representation of a target color;
   receiving a spectral definition of each colorant in a set of colorants;
   obtaining an initial set of colorant concentrations for the set of colorants, each concentration corresponding to a respective colorant in a set of colorants; and
   generating iteratively a final set of colorant concentrations by calculating a rendered color value, the rendered color value being a nonspectral representation of a rendered color produced by a mixture of colorants defined by the set of colorant concentrations, calculating a difference between the rendered color and the target color, and modifying the set of colorant concentrations according to the calculated difference.

2. The method of claim 1, further comprising:
   receiving a threshold to be achieved, wherein the iteration terminates when a calculated difference between the rendered color and the target color is less than the threshold or an iteration limit is reached.

3. The method of claim 1, wherein obtaining an initial set of colorant concentrations comprises:
   using the target color value to select an index into a colorant concentration lookup table; and
   obtaining the initial set of colorant concentrations from the indexed contents of the lookup table.

4. The method of claim 1, wherein calculating a rendered color corresponding to the set of colorant concentrations comprises:
   calculating a rendered color reflectivity function from the set of colorant concentrations and a set of colorant reflectivity functions, each colorant reflectivity function corresponding to a respective one of the colorants; and
   calculating a rendered color value from the rendered color reflectivity function.

5. The method of claim 4, wherein the rendered color value is calculated using an illuminant selected in response to a user input identifying desired viewing conditions.

6. The method of claim 1, wherein modifying the set of colorant concentration values comprises:
   calculating a set of colorant concentration corrections from the difference between the rendered color value and the target color value.

7. The method of claim 1, wherein the target color value is a triple defining a location in a color space.

8. The method of claim 1, wherein the target color value defines a device-independent color.

9. The method of claim 1, wherein the difference between the rendered color and the target color is calculated in a perceptually linear color space.

10. The method of claim 9, wherein the perceptually linear color space is CIELAB or CIELUV.

11. The method of claim 1, wherein the set of colorants is an arbitrary set of two or more colorants.

12. The method of claim 1, wherein the spectral representation of each colorant derives from reflectivity measurements of the colorant taken at intervals over the visible spectrum without overprinting.

13. The method of claim 1, wherein modifying the set of colorant concentration values comprises:
   modeling the difference between the target color and the rendered color as a scalar field over the set of colorants; and
   calculating a partial derivative of the surface with respect to each colorant to calculate a correction for each colorant.

14. A computer program product, tangibly stored on a computer-readable medium, for matching a color, the product comprising instructions operable to cause a computer to:

receive a target color value, the target color value being a nonspectral representation of the target color;

obtain an initial set of colorant concentrations, each concentration in the set corresponding to a respective colorant in the set of colorants; and generate iteratively a final set of colorant concentrations by calculating a rendered color value, the rendered color value being a nonspectral representation of a rendered color produced by a mixture of the colorants defined by the set of colorant concentrations, calculating a difference between the rendered color and the target color, and modifying the set of colorant concentrations according to the calculated difference.

15. The product of claim 14, wherein instructions to obtain an initial set of colorant concentrations comprise instructions to:

use the target color value to select an index into a colorant concentration lookup table; and obtain the initial set of colorant concentrations from the indexed contents of the lookup table.

16. The product of claim 14, wherein instructions to calculate a rendered color corresponding to the set of colorant concentrations comprise instructions to:

select an illumination function;

calculate a rendered color reflectivity function from the set of colorant concentrations and a set of colorant reflectivity functions, each corresponding to a respective one of the colorants; and calculate a rendered color value from the illumination function and the rendered color reflectivity function.

17. The product of claim 16, further comprising instructions to select the illumination function in response to a user input identifying a desired viewing condition.

18. The product of claim 14, wherein instructions to modify the set of colorant concentration values comprise instructions to:

calculate a set of colorant concentration corrections from the difference between the rendered color value and the target color value; and add the set of colorant concentration corrections to the set of colorant concentrations.

19. A system, comprising:

means for receiving a target color value, the target color value being a nonspectral representation of a target color;

means for obtaining an initial set of colorant concentrations, each concentration in the set corresponding to a respective colorant in the set of colorants; and means for generating iteratively a final set of colorant concentrations by calculating a rendered color value, the rendered color value being a nonspectral representation of a rendered color produced by a mixture of the colorants defined by the set of colorant concentrations, calculating a difference between the rendered color and the target color, and modifying the set of colorant concentrations according to the calculated difference.

20. A method for mapping a nonspectral representation of an input color to a set of concentration values for a set of device-specific colorants, the representation being an input color tuple, comprising:

using the input color tuple to derive a first set of colorant concentration values from a color lookup table; and refining the first set of colorant concentration values by an iterative non-linear process to generate a final set of colorant concentration values.

21. The method of claim 20, wherein the first set of colorant concentration values is derived by using the input color tuple as an index to obtain grid-point concentration values at two grid points of the color lookup table and calculating the first set of colorant concentration values as a linear interpolation of the grid-point concentration values.

22. The method of claim 20, further comprising providing a color function table of color-additive function values, wherein the iterative non-linear process comprises:

iteratively (a) calculating an interim color tuple from an interim set of colorant concentration values and the color function table, the initial interim set of colorant concentration values being the first set of colorant concentration values, and (b) deriving an interim set of colorant concentration values from a difference between the input color tuple and the interim color tuple.

23. The method of claim 22, further comprising:

calculating a partial derivative of an error function from the difference between the input color tuple and the interim color tuple; and using the partial derivative to derive a successor interim set of colorant concentration values from a current interim set of colorant concentration values.

24. A system for mapping a nonspectral representation of an input color to a set of concentration values for a set of device-specific colorants, the representation being an input color tuple, comprising:

means for using the input color tuple to derive a first set of colorant concentration values from a color lookup table; and means for refining the first set of colorant concentration values by an iterative non-linear process to generate a final set of colorant concentration values.

25. The system of claim 24, wherein:

the system further comprises means for providing a color function table of color-additive function value; and the iterative non-linear process comprises means for iteratively performing the following actions: (a) calculating an interim color tuple from an interim set of colorant concentration values and the color function table, the initial interim set of colorant concentration values being the first set of colorant concentration values, and (b) deriving an interim set of colorant concentration values from a difference between the input color tuple and the interim color tuple.

26. The system of claim 25, further comprising:

means for calculating a partial derivative of an error function from the difference between the input color tuple and the interim color tuple; and means for using the partial derivative to derive a successor interim set of colorant concentration values from a current interim set of colorant concentration values.

27. A computer program product, tangibly stored on a computer-readable medium, for mapping a nonspectral representation of an input color to a set of concentration values for a set of device-specific colorants, the representation being an input color tuple, the product comprising instructions operable to cause a computer to:

use the input color tuple to derive a first set of colorant concentration values from a color lookup table; and refine the first set of colorant concentration values by an iterative non-linear process to generate a final set of colorant concentration values.

28. The product of claim 27, further comprising instructions operable to cause a computer to derive the first set of colorant concentration values by using the input color tuple as an index to obtain grid-point concentration values at two grid points of the color lookup table and calculate the first set of colorant concentration values as a linear interpolation; of the grid-point concentration values.

29. The product of claim 27, for use with a color function table of color-additive function values, the product further comprising instructions operable to cause a computer to perform the iterative non-linear process iteratively (a) calculating an interim color tuple from an interim set of colorant concentration values and the color function table, the initial interim set of colorant concentration values being the first set of colorant concentration values, and (b) deriving an interim set of colorant concentration values from a difference between the input color tuple and the interim color tuple.

30. The product of claim 29, further comprising instructions operable to cause a computer to:

calculate a partial derivative of an error function from the difference between the input color tuple and the interim color tuple; and use the partial derivative to derive a successor interim set of colorant concentration values from a current interim set of colorant concentration values.

31. The product of claim 30, wherein the input color tuple is a device-independent triple and the interim color tuple is a device-independent triple.

* * * * *

UNITED STATES PATENT AND TRADEMARK OFFICE
CERTIFICATE OF CORRECTION

PATENT NO. : 6,646,763 B1
DATED : November 11, 2003
INVENTOR(S) : James J. Estrada It is certified that error appears in the above-identified patent and that said Letters Patent is hereby corrected as shown below:

Title page,
Item [56], References Cited, OTHER PUBLICATIONS, "Allen," reference, replace "two-constant theroy" with -- two-constant theory --
"Kuehni," reference, replace "Kuehai" with -- Kuehni --

Column 6,
Lines 49-50, replace "$\lambda$ (yellow) and A ranges over the visible spectrum," with
-- Y (yellow) and $\lambda$ ranges over the visible spectrum, --

Column 12,
Line 3, replace "respective colorant is a set of colorants;" with -- respective colorant is the set of colorants; --
Lines 9-10, 15 and 47, "rendered color and the target color" with -- rendered color value and the target color value --
Line 16, replace "threshold or an iteration limit is reached." with -- threshold. --
Line 24, replace "color" with -- color value --
Line 32, replace "a rendered color value" with -- the rendered color value --
Line 54, replace "each colorant derives" with -- each colorant is derived --
Lines 59-60, replace "target color and the rendered color" with -- target color value and the rendered color value --

Column 13,
Lines 11-12 and 56-57, replace "rendered color and the target color" with -- rendered color value and the target color value --
Line 22, replace "calculate a rendered color" with -- calculate a rendered color value --
Line 27, replace "each corresponding" with -- each colorant reflectivity function corresponding --
Line 29, replace "a rendered color value" with -- the rendered color value --
Line 61, replace "the representation being an input" with -- the nonspectral representation of the input color being an input --

Column 14,
Lines 18 and 48-49, replace "derivative of an error function from" with -- derivative of an error function derived from --
Lines 26 and 57-58, replace "the representation being an input" with -- the nonspectral representation of the input color being an input --

UNITED STATES PATENT AND TRADEMARK OFFICE
CERTIFICATE OF CORRECTION

PATENT NO.   : 6,646,763 B1
DATED        : November 11, 2003
INVENTOR(S)  : James J. Estrada It is certified that error appears in the above-identified patent and that said Letters Patent is hereby corrected as shown below:

Column 15,
Line 3, replace "linear interpolation; of" with -- linear interpolation of --

Column 16,
Line 4, replace "derivative of an error function from" with -- derivative of an error function derived from --

Signed and Sealed this

Seventeenth Day of August, 2004

JON W. DUDAS
*Acting Director of the United States Patent and Trademark Office*